United States Patent [19]
Renau

[11] Patent Number: 5,835,993
[45] Date of Patent: Nov. 10, 1998

[54] AC MOTOR CONTROLLING APPARATUS

[75] Inventor: Karol Renau, Calabasas, Calif.

[73] Assignee: Renau Corporation, Canoga Park, Calif.

[21] Appl. No.: 857,551

[22] Filed: May 16, 1997

[51] Int. Cl.[6] ........................................ H02P 1/26
[52] U.S. Cl. ........................ 318/778; 426/231; 221/1; 221/59; 221/20
[58] Field of Search .................................. 222/1, 59, 20; 426/231; 318/778

[56] References Cited

U.S. PATENT DOCUMENTS

| | | | |
|---|---|---|---|
| 4,979,639 | 12/1990 | Hoover et al. | 222/1 |
| 5,249,706 | 10/1993 | Szabo | 222/20 |
| 5,393,540 | 2/1995 | Bunn et al. | 222/20 X |
| 5,622,330 | 4/1997 | Sharp et al. | 222/59 X |

*Primary Examiner*—Karen Masih
*Attorney, Agent, or Firm*—Fulwider Patton Lee & Utecht, LLP

[57] ABSTRACT

An apparatus for incrementally controlling actuation of an alternating current motor and rotation of the motor shaft, to incrementally control rotation of a rotatable member connectable to the motor shaft. The apparatus includes motor pulsing elements for controlling actuation of the motor and rotation of the motor shaft and rotatable member. The motor pulsing elements increase or decrease motor actuation and motor shaft and rotatable member rotation in increments of about ten percent, between about ten and one-hundred percent of full actuation and rotation, for correspondingly controlling a system controllable thereby, such as a beverage powder dispensing system in a beverage dispensing machine.

10 Claims, 2 Drawing Sheets

AC MOTOR CONTROLLING APPARATUS

BACKGROUND OF THE INVENTION

1. Field of the Invention

This invention relates to an apparatus for controlling an alternating current motor, for example to provide incremental control of the alternating current motor and an element in a system controlled thereby.

2. Description of the Related Art

Controlling the speed of an alternating current motor, so as to control a system controlled by the motor, has been complicated, expensive, and inefficient. A system controllable by an alternating current motor may comprise, for example, a beverage powder dispensing system in a beverage dispensing machine such as a cappuccino dispensing machine. Control of the alternating current motor, and of the beverage powder dispensing system provides control over the amount of beverage powder in the dispensed beverage. The speed of an alternating current motor, and the voltage, are controlled by the frequency, such that the motor will continuously run at the assigned speed at 60 cycles per second. The motor speed cannot be controlled by the voltage, since the motor will still run at the same speed. Changing the frequency to control motor speed has been complicated, expensive, and inefficient, including rectifying ac to dc, and modulating dc to attain the desired frequency, requiring rectifiers and modulators.

SUMMARY OF THE INVENTION

The present invention is directed to the above and other problems associated with alternating current motor controlling apparatuses.

It relates to an apparatus which incrementally controls an alternating current motor, for controlling a system controllable by the motor.

In an exemplary embodiment of the present invention, the apparatus is adapted to incrementally control rotation of a rotatable member connectable to the motor shaft. It includes an element for pulsing the motor, to digitally modulate the motor so as to incrementally increase or decrease rotation of the motor shaft and the rotatable element connectable thereto.

The apparatus is adapted to efficiently and economically control actuation of the motor and rotation of the motor shaft and rotatable element, to incrementally increase or decrease such actuation and rotation for example between about ten percent and about one-hundred percent of full rotation thereof.

These and other advantages of the invention will become more apparent from the following detailed description when taken in conjunction with the accompanying drawings.

DETAILED DESCRIPTION OF THE PREFERRED EMBODIMENT

Figure 1:
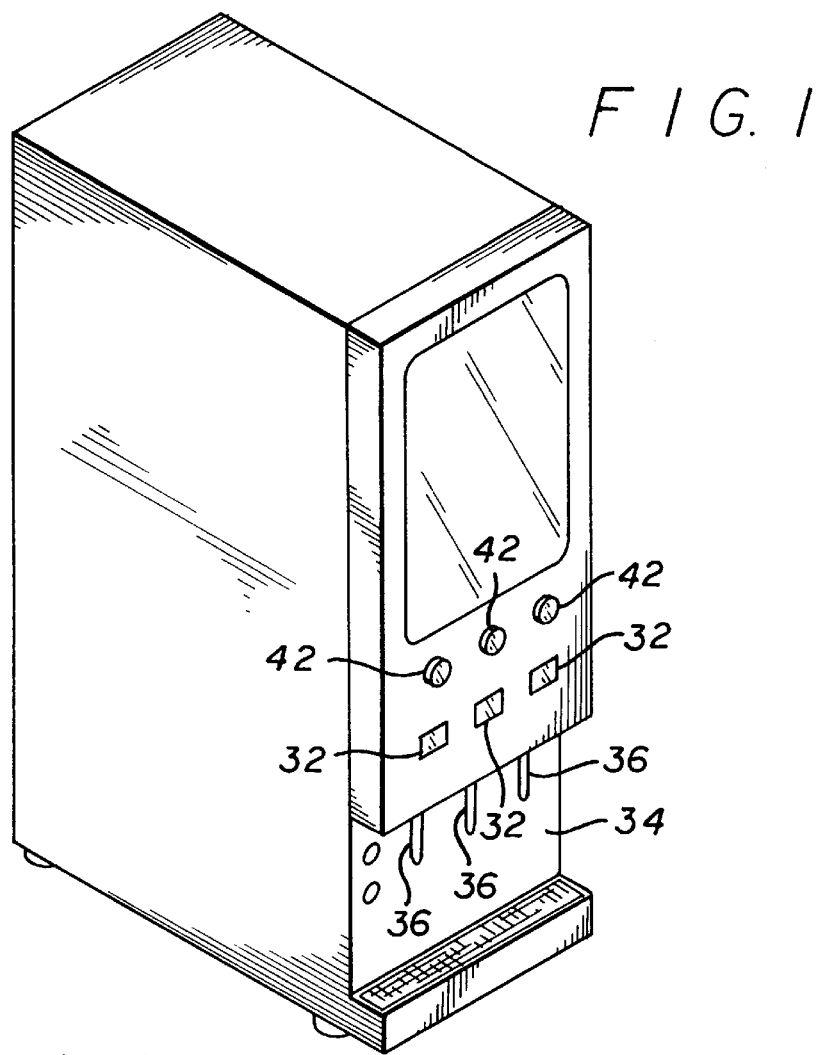
FIG. 1 is a perspective view of a beverage dispensing machine which includes a plurality of motor controlling apparatuses in accordance with the present invention.

As shown in the drawings, the invention is directed to an apparatus 10 for incrementally controlling an alternating current motor 12, motor controlling apparatus 10 includes an alternating current motor 12 including a motor shaft 14 to which a rotatable element 16 in a system 18 controlled by motor 12 is connectable. Apparatus 10 further includes pulsing elements 20 which programmably modulate motor 12, to incrementally control actuation of motor 12 and rotation of motor shaft 14 and rotatable element 16, so as to incrementally increase or decrease rotation of rotatable element 16.

Motor pulsing elements 20, for example, are adapted to control actuation of motor 12 and rotation of motor shaft 14 and rotatable element 16 so as to increase or decrease such actuation and rotation in increments of about ten percent, between about ten percent and about one-hundred percent of full actuation and rotation thereof.

Motor pulsing elements 20 include an element 22 for processing rotation of motor shaft 14 over time, and an element 24 for switching rotation of motor shaft 14 on and off responsive to processing element 22. Processing element 22 comprises a microprocessor 26, an element 28 for generating pulses, and an element 30 for activating a program in microprocessor 24 responsive thereto. Microprocessor 24 is programmed such that actuation of activating element 30 in a preset sequence provides programmed instructions to microprocessor 26 for operation thereof. Switching element 24 comprises a triac, for electrically controlling switching of ac motor 12. Activating element 30 comprises a push button 32, connected to microprocessor 26.

Figure 2:
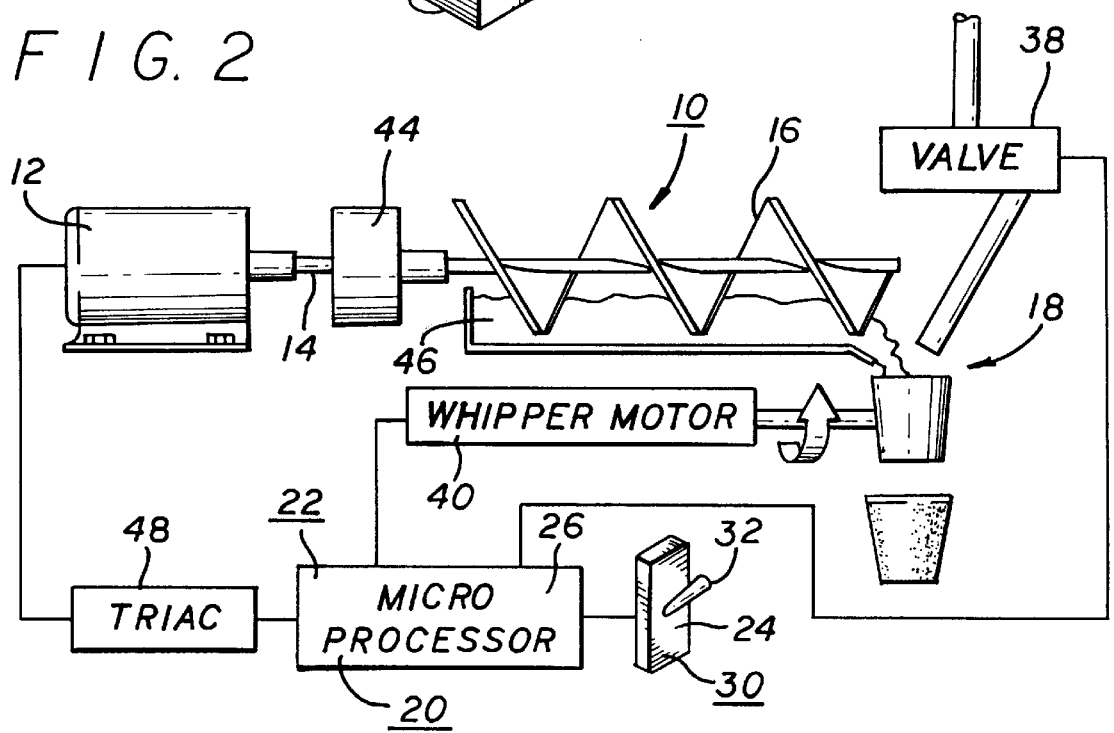
FIG. 2 is a is a partly-block diagram of the elements of a motor controlling apparatus in accordance with the present invention.

In an exemplary embodiment as shown in FIGS. 1–2, a plurality of motor controlling apparatuses 10 are adapted to be installed in a beverage dispensing machine 34, one apparatus 10 for each of a plurality of beverage dispensing stations 36. In each motor controlling apparatus 10, microprocessor 26 in addition to controlling motor 12, further controls a valve 38 for controlling dispensing of water for the beverage mixture to be dispensed, and a whipper motor 40 for mixing powder 36 and water prior to dispensing thereof. Each push button 32 is associated with a light emitting diode 42.

Each station 32 in machine 34 is separately actuatable and programmable, for regulating the proportion of metered powder to be mixed with water, based on beverage taste and efficiency of operation for beverage mixing and dispensing. Metered beverage dispensing in each apparatus 10 is dependent upon the amount of rotation of rotatable element 16, as controlled by apparatus 10, with incremental control of such rotation provided by pulsing elements 20. Each apparatus 10 in dispensing machine 34 includes motor 12 including motor shaft 14, and a gear box 44 to which a rotatable element 16 is connectable, rotatable element 16 comprises an auger for dispensing a beverage powder 46, such as cappuccino powder, adapted to be mixed with water dispensed through a spout 48 controlled by valve 38, to form a cappuccino beverage to be dispensed by machine 34. Microprocessor 26 preferably includes flash memory, such that memory therein is operable without requiring a battery. Microprocessor 24 is connected to a triac 48 for controlling motor 12, and whipper motor 40 for controlling mixing of the beverage powder 46 and water. Light emitting diodes 42 indicate programmed entry of actuations of associated push buttons 32 for operation of microprocessor 26 at each station 36.

When it is desired to increase or decrease rotation of rotatable element 16 in motor controlling apparatus 10, the technician pushes push button control 32 in a preset sequence, providing programmed instructions to microprocessor 26 connected thereto. Microprocessor 26 in turn activates triac 48 to generate pulses for electrically controlling switching motor 12 on and off responsive thereto, so as to incrementally control rotation of motor shaft 14 and rotatable element 16 connected thereto. Preferably, rotation of rotatable element 16 is controlled in increments of about ten percent, between about ten percent and about one-hundred percent of rotation thereof.

Figure 3:
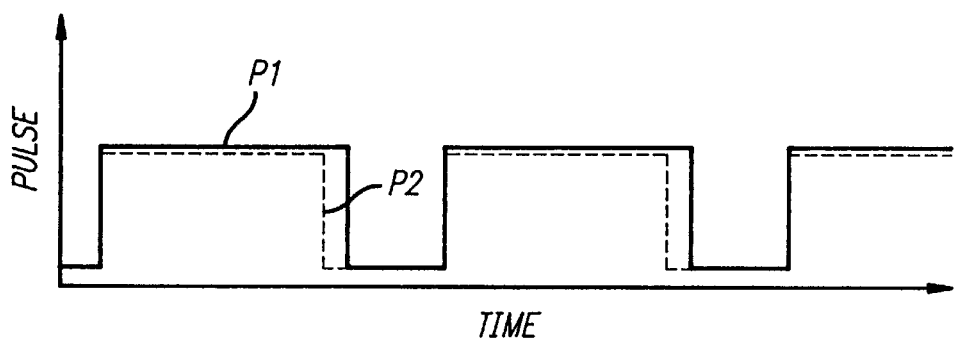
FIG. 3 is a graph of pulses over time for an alternating current motor in the motor controlling apparatus in accordance with the present invention.
Figure 4:
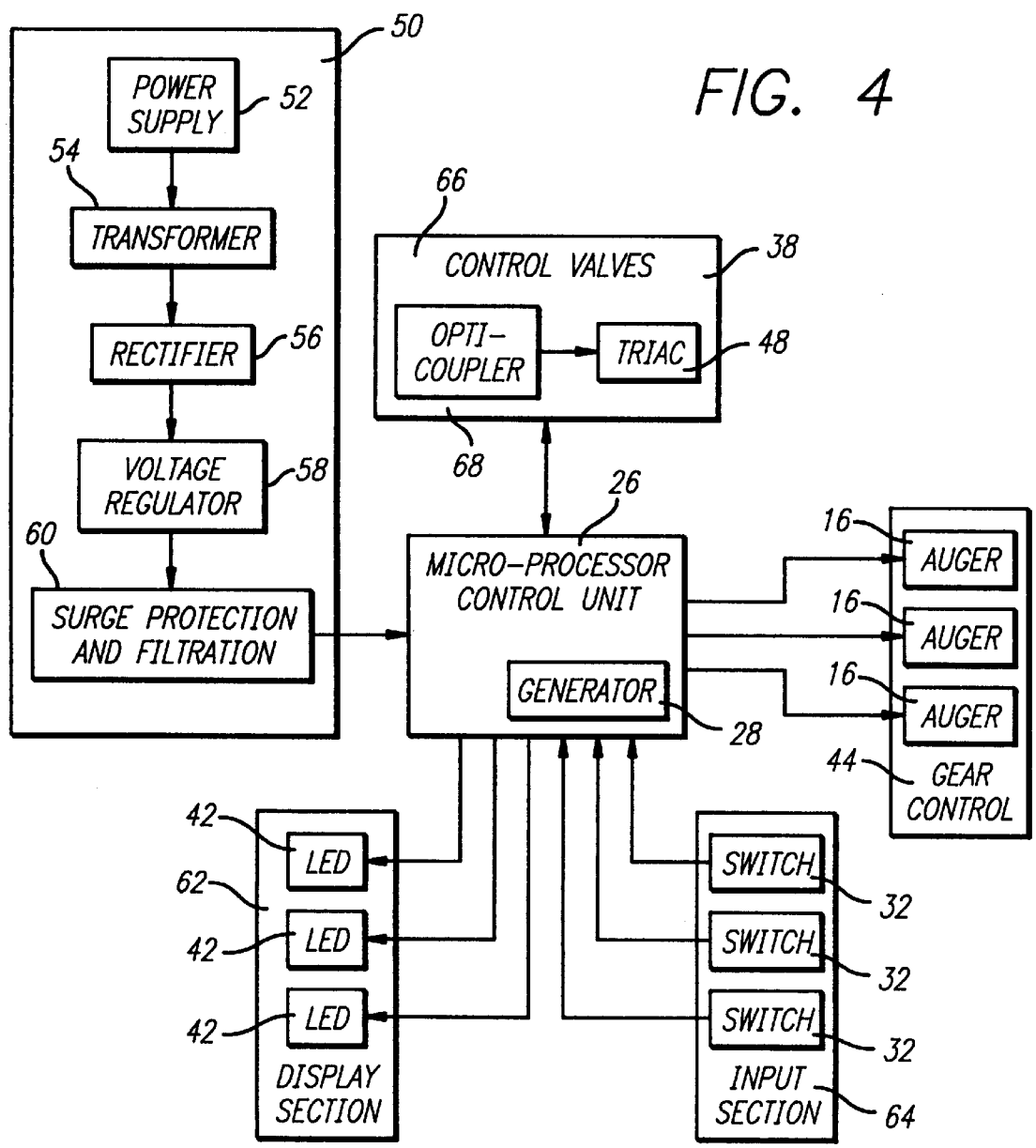
FIG. 4 is a block diagram of the motor controlling apparatus in the beverage dispensing machine in accordance with the present invention.

For example, as shown in the graph in FIG. 3 of pulses over time, alternating current motor 12 turns a 750 milli-second pulse at one-hundred percent of operation, as shown by the solid line. To regulate motor 12 and reduce rotation of rotatable element 16 by ten percent, to ninety percent of rotation, as shown by the dashed line in FIG. 3, push button control 32 is pushed in the preset sequence for reducing rotation by ten percent, actuating microprocessor 26 which responds pursuant to programmed instructions to reduce the pulse by ten percent. For example, pushing any two push buttons 32 and holding them in for five seconds causes microprocessor 26 to go to its menu system, and thereafter pushing push button 32 for the particular station 36 to be modified identifies the particular station 36 to microprocessor 26. Microprocessor 26 then causes the light emitting diode 42 associated with the particular push button 32 to flash the number of times corresponding to the previously set percentage of full rotation which the rotatable auger 16 associated with the particular station 36 is rotating at to deliver beverage feeder 46, for example, three flashes for thirty percent of full rotation. To reduce the percentage of full rotation by ten percent, for example, to ninety percent of full rotation, the technician then pushes in and holds push button 32 until light emitting diode 42 flashes nine times for ninety percent. Upon releasing push button 32, microprocessor 26 causes emitting diode 42 to flash the number of times corresponding to the new percentage of full pulse generated in motor 12. Pressing any push button 32 then finishes the program, which is then written into memory in microprocessor 26.

After setting the new pulse time, triac 48 then switches motor 12 and motor shaft 14 on for only the time of the pulse, reducing rotation of rotatable element 16 by ten percent to ninety percent of rotation thereof. A similar process would be performed for decreasing rotation by more than ten percent, and for increasing rotation.

In the exemplary embodiment, such process would be performed if it was desired to reduce the amount of beverage powder dispensed by ten percent, and a similar process could be performed to reduce such amount by other than ten percent, and to increase such amount.

While in the preferred embodiment the apparatus described is intended to be an ac motor controlling apparatus, it will be appreciated by those skilled in the art that modifications may be made to the present invention to allow the present invention to be used in any type of ac system. The present invention is not limited to ac motor systems in beverage dispensing machines, but has wide applications to controlling any type of ac motor system. Other modifications can be made to the present invention by those skilled in the art without departing from the scope thereof.

I claim:

1. An apparatus for incrementally controlling the actuation of an alternating current motor and the rotation of the motor shaft, to incrementally control the rotation of a rotatable element connectable to the motor shaft, so as to incrementally increase or decrease the rotation of the rotatable element, comprising:

(a) an alternating current motor, including a motor shaft to which the rotatable element is connectable; and (b) means for incrementally controlling the actuation of the motor and the rotation of the motor shaft, and for incrementally controlling the rotation of the rotatable element connected to the motor shaft, to incrementally increase or decrease the rotation of the rotatable element, comprising means for processing the rotation of the motor shaft over time, which comprise a microprocessor, and means for switching the rotation of the motor shaft on and off responsive to the microprocessor, such that the motor shaft rotates incrementally responsive thereto, wherein the switching means are connected to the motor, and the microprocessor is connected to the switching means for control thereof, and means for actuating the microprocessor, connected to the microprocessor, such that actuation of the actuating means in a preset sequence provides programmed instructions to the microprocessor responsive thereto for controlling the switching means and for incrementally rotating the motor shaft responsive thereto.

2. The apparatus of claim 1, wherein the incrementally controlling means control rotation of the motor shaft and the rotatable element in increments of about ten percent, between about ten percent and about one-hundred percent of full rotation thereof.

3. The apparatus of claim 1, adapted to be installed in a beverage dispensing machine, further comprising a rotatable element connectable to the motor shaft, adapted to dispense a beverage ingredient in an amount dependent upon the amount of rotation thereof, and means for connecting the rotatable member to the motor shaft.

4. The apparatus of claim 1, wherein the switching means comprise a triac.

5. The apparatus of claim 3, wherein the rotatable element comprises an auger for dispensing the beverage ingredient.

6. The apparatus of claim 1, wherein the activating means comprise a push button, connected to the processing means.

7. The apparatus of claim 5, wherein the beverage ingredient comprises a beverage powder.

8. The apparatus of claim 5, wherein the beverage powder comprises cappuccino powder.

9. A method of incrementally controlling the actuation of an alternating current motor and the rotation of the motor shaft, to incrementally control the rotation of a rotatable element connected to the motor shaft, so as to incrementally increase or decrease the rotation of the rotatable element, comprising:

(a) activating an apparatus which includes an alternating current motor including a motor shaft to which the rotatable element is connectable, and means for incrementally controlling the actuation of the motor and the rotation of the motor shaft, and for incrementally controlling the rotation of the rotatable element connected to the motor shaft, to incrementally increase or decrease the rotation of the rotatable element, comprising means for processing the rotation of the motor shaft over time, which comprise a microprocessor, and means for switching the rotation of the motor shaft on and off responsive to the microprocessor, such that the motor shaft rotates incrementally responsive thereto, wherein the switching means are connected to the motor, and the microprocessor is connected to the switching means for control thereof, and means for actuating the microprocessor, connected to the microprocessor, such that actuation of the actuating means in a preset sequence provides programmed instructions to the microprocessor responsive thereto for controlling the switching means and for incrementally rotating the motor shaft responsive thereto; and (b) activating the actuating means in a preset sequence to provide programmed instructions to the microprocessor for controlling the switching means to incrementally control the rotation of the rotatable element connected to the motor shaft, so as to incrementally increase or decrease the rotation of the rotatable element.

10. The method of claim 9, wherein the step of incremetally controlling the motor comprises pulsing so as to control rotation of the motor shaft and rotatable element in increments of about ten percent, between about ten percent and about one-hundred percent of full rotation of the motor shaft and rotatable element.

* * * * *